United States Patent
Goto

[11] 4,240,704
[45] Dec. 23, 1980

[54] OBJECTIVE FOR VIDEO DISKS
[75] Inventor: Atsuo Goto, Tachikawa, Japan
[73] Assignee: Olympus Optical Co., Ltd., Tokyo, Japan
[21] Appl. No.: 962,804
[22] Filed: Nov. 21, 1978
[30] Foreign Application Priority Data
  Nov. 29, 1977 [JP] Japan .................. 52-142166
[51] Int. Cl.³ .............................. G02B 9/34
[52] U.S. Cl. .................................. 350/220
[58] Field of Search .............. 350/220, 175 ML
[56] References Cited
  U.S. PATENT DOCUMENTS
  1,967,836 7/1934 Merte ..................... 350/220
  2,536,508 1/1951 Lotmar ................... 350/220
  3,989,317 11/1976 Maeda .................... 350/229
  4,046,460 9/1977 Koizumi ............ 350/175 ML X FOREIGN PATENT DOCUMENTS
  2554599 6/1976 Fed. Rep. of Germany .
  124660 9/1975 Japan .

Primary Examiner—Paul A. Sacher
Attorney, Agent, or Firm—Cushman, Darby & Cushman

[57] ABSTRACT

An objective for video disks comprising a first, second, third and fourth lenses in which the first lens is a biconvex lens, the second lens is a negative lens, the third lens is a positive lens, and the fourth lens is a positive lens and for which N.A. is large and aberrations such a spherical aberration, astigmatism, etc. are corrected favorably.

5 Claims, 5 Drawing Figures

OBJECTIVE FOR VIDEO DISKS

BACKGROUND OF THE INVENTION (a) Field of the Invention

The present invention relates to an objective for video disks and, more particularly, to an objective for reading out the signals recorded on high-density information-recording disks (video disks).

(b) Description of the Prior Art

For objectives to be used in reproducing systems for video disks, it is required to warrant resolving power of $1\mu$ due to the fact that the objective has to read out very small signals recorded with high density. Moreover, the information read out from the disk, which rotates at high speed, contains signals for making the objective follow up the recorded track and signals for automatic focusing in addition to image information. To make the objective read out those information and signals correctly, the flatness of image focused by the objective should be high. To prevent breakage of the video disk and objective which will be caused when the objective contacts the video disk, the working distance of the objective should be long. Besides, to perform automatic focusing, the objective should be compact and light in weight. Moreover, the price of the objective should be low.

As the light used for the objective for video disks is generally a monochromatic light ($\lambda = 6328$ Å), it is effective for eliminating the noise at the time of amplifying the signals from a detector when transparency for the light of this wavelength is as high as possible. Therefore, to make transparency high, it is necessary to provide multi-layer anti-reflection coating on the lens surface or to make the number of lenses constituting the objective as small as possible. When this problem is considered in connection with the above-mentioned other requirements such as low price and light weight, it is more advantageous when the number of lenses constituting the objective is made as small as possible.

Some of known objectives for video disks are arranged to meet the above-mentioned requirements. However, known objectives for video disks have N.A. about 0.4 to 0.45 and comprise about four lenses. When, however, semi-conductor laser is used as the light source, the wavelength of light is long and, therefore, an objective with large N.A. is required. Moreover, for an objective for video disks with high recording density, large N.A. is required. But, known objectives for video disks do not meet this requirement satisfactorily. Therefore, it is required to provide an objective for which aberrations are favourably corrected up to large N.A. If, however, the number of lenses is increased in order to obtain large N.A., it is disadvantageous for obtaining a light-weight objective.

SUMMARY OF THE INVENTION

It is, therefore, a primary objective of the present invention to provide an objective for video disks for which the number of lenses is small, the weight is light, the N.A. is large so that the objective can be used with the light about $\lambda = 8400$ Å from a semi-conductor laser and, moreover, spherical aberration and astigmatism are corrected favourably.

The objective for video disks according to the present invention has the lens configuration as shown in FIG. 1, i.e., it comprises a first, second, third and fourth lenses in the order from the light-receiving element side to the video disk side. The first lens is a biconvex lens, the second lens is a negative lens, the third lens is a positive lens and the fourth lens is also a positive lens. Besides, the objective for video disks according to the present invention satisfies the following conditions:

$$0.7 < r_3/r_2 < 1.05 \tag{1}$$

$$0.7 < |r_3|/f < 1.2, \; r_3 < 0 \tag{2}$$

$$0.4 < r_7/f < 0.65 \tag{3}$$

wherein reference symbol $r_2$ represents the radius of curvature of the surface on the second lens side of the first lens, reference symbol $r_3$ represents the radius of curvature of the surface on the first lens side of the second lens, reference symbol $r_7$ represents the radius of curvature of the surface on the third lens side of the fourth lens, and reference symbol $f$ represents the focal length of the lens system as a whole.

The upper and lower limits of the above-mentioned conditions have meanings as explained below.

The condition (1) is required for the purpose of correcting spherical aberration favourably. As spherical aberration caused at the surface on the second lens side of the first lens is large, it is necessary to correct it by the surface on the first lens side of the second lens. For this purpose, the relation between radii of curvature $r_2$ and $r_3$ of these surface is defined as shown by the condition (1). If $r_3/r_2$ becomes smaller than the lower limit of the condition (1), spherical aberration will be overcorrected. If $r_3/r_2$ becomes larger than the upper limit, spherical aberration will be undercorrected.

If, in the condition (2), $|r_3|/f$ becomes smaller than the lower limit, residual spherical aberration in the marginal portion becomes too large. If $|r_3|/f$ becomes larger than the upper limit, residual spherical aberration in the intermediate portion becomes too large.

The condition (3) is established for the purpose of correcting astigmatism which should be eliminated when designing an objective for video disks. If $r_7/f$ in the condition (3) becomes larger than the upper limit, astigmatism will be overcorrected. If $r_7/f$ becomes smaller than the lower limit, astigmatism will be undercorrected. In both cases, astigmatic difference will be caused.

Besides, when the above lens system further satisfies the following conditions, it is possible to obtain a more favourable objective for video disks.

$$0.2 < d_7/f < 0.4 \tag{4}$$

$$d_2/f < 0.12 \tag{5}$$

$$1.1f < d_4 + d_5 + d_6 < 1.3f \tag{6}$$

$$-0.46 < f/r_6 < 0.08 \tag{7}$$

$$n_1, n_3, n_4 < 1.55, \; n_2 > 1.7 \tag{8}$$

$$\nu_1, \nu_3, \nu_4 > 60, \; \nu_2 < 30 \tag{9}$$

wherein reference symbols $d_5$ and $d_7$ respectively represent thicknesses of the third and fourth lenses, reference symbol $d_2$ represents the airspace between the first and second lenses, reference symbol $d_4$ represents the airspace between the second and third lenses, reference symbol $d_6$ represents the airspace between the third and fourth lenses, reference symbol $r_6$ represents the radius of curvature of the surface on the fourth lens side of the third lens, reference symbols $n_1$, $n_2$, $n_3$ and $n_4$ respectively represent refractive indices of respective lenses, and reference symbols $\nu_1$, $\nu_2$, $\nu_3$ and $\nu_4$ respectively represent Abbe's numbers of respective lenses.

If, in the condition (4), $d_7/f$ becomes smaller than the lower limit, spherical aberration in the intermediate portion becomes large. If $d_7/f$ becomes larger than the upper limit, it becomes impossible to make the working distance large.

If, in the condition (5), $d_2/f$ becomes larger than the upper limit, coma will be aggravated and, moreover, spherical aberration in the intermediate portion will become large.

If the value defined by the condition (6) becomes smaller than its lower limit, astigmatism will be undercorrected and it becomes difficult to correct it favourably. If the above value becomes larger than the upper limit, the working distance becomes short and this is not desirable.

If, in the condition (7), $f/r_6$ becomes smaller than the lower limit, spherical aberration will be undercorrected. If $f/r_6$ becomes larger than the upper limit, spherical aberration in the intermediate portion becomes large.

The condition (8) is established for the purpose of increasing the effects of conditions (1) through (7) in correction of aberrations and so forth. When glass materials which satisfy the condition (8) are used, the effects of conditions (1) through (7) are further increased.

When glass materials having dispersive powers which satisfy the condition (9) are used, it is possible to correct chromatic aberration of the lens system. By arranging as above, it is possible to minimize the change of focal point by colour and it is possible to use the lens system for a wide range of wavelengths.

DETAILED DESCRIPTION OF THE PREFERRED EMBODIMENTS

Figure 1:
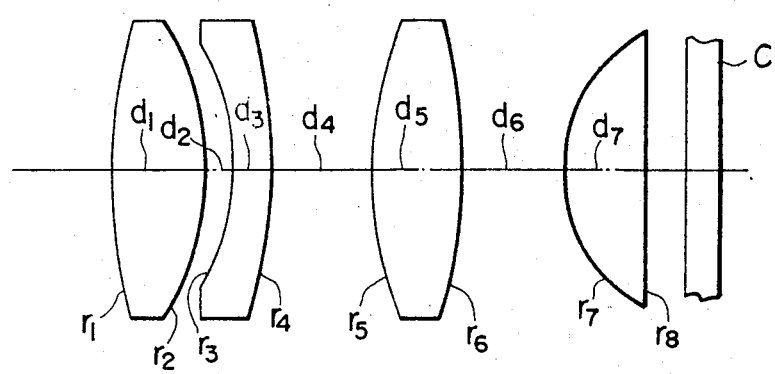
FIG. 1 shows a sectional view of the objective for video disks according to the present invention.
Figure 2:
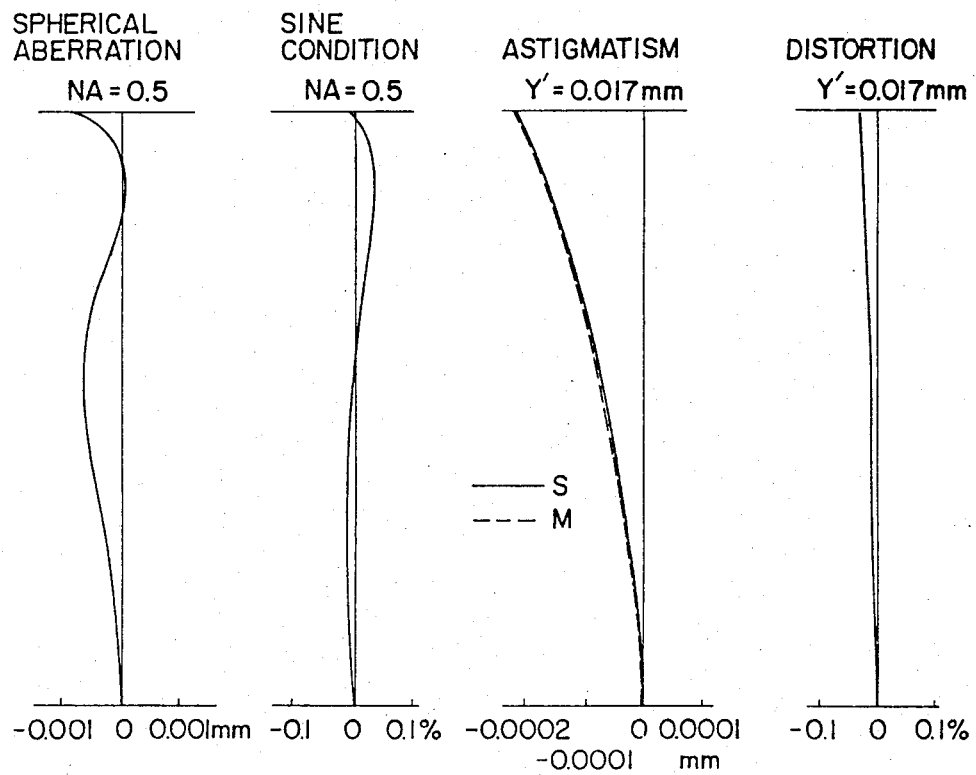
FIG. 2 shows graphs illustrating aberration curves of Embodiment 1 of the present invention.
Figure 3:
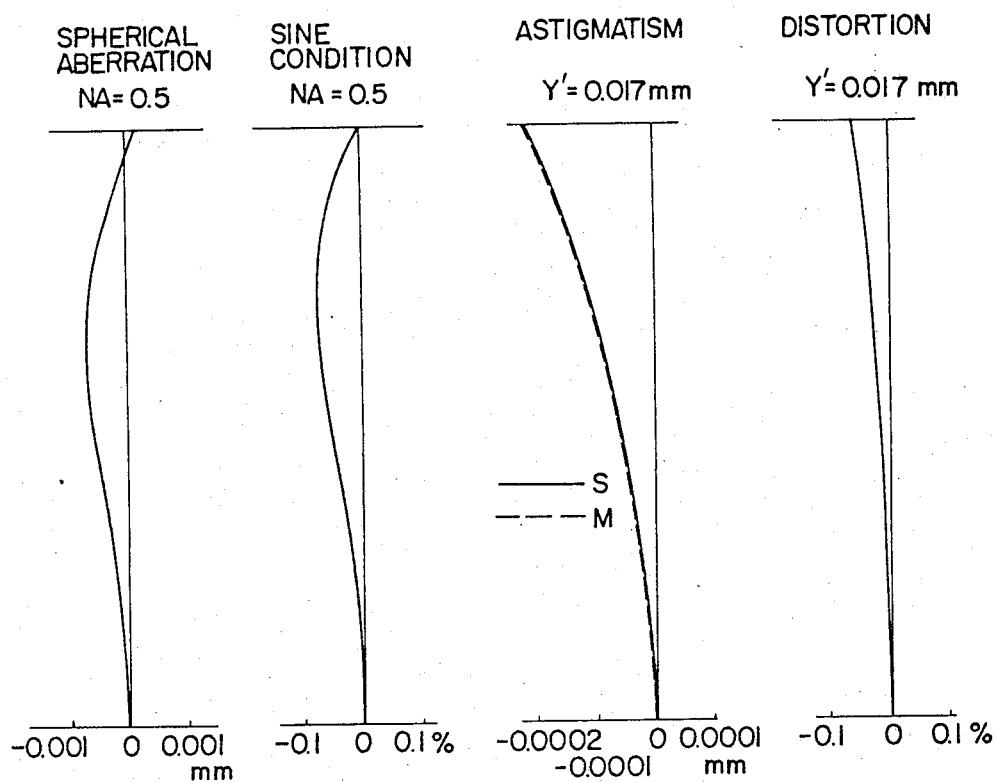
FIG. 3 shows graphs illustrating aberration curves of Embodiment 2.
Figure 4:
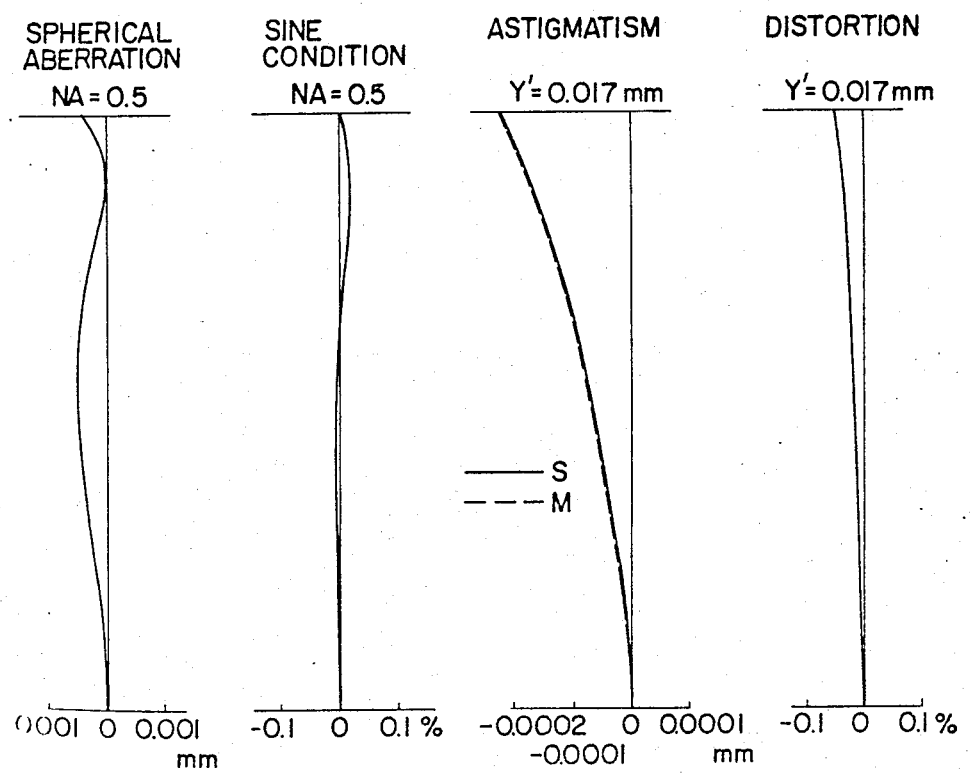
FIG. 4 shows graphs illustrating aberration curves of Embodiment 3.
Figure 5:
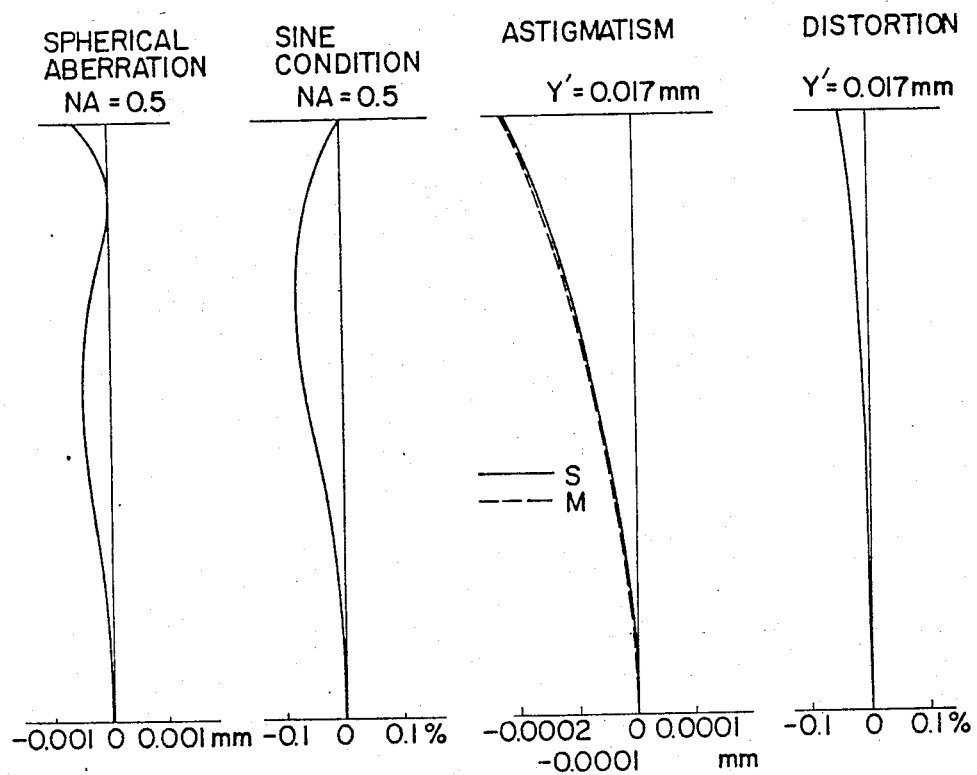
FIG. 5 shows graphs illustrating aberration curves of Embodiment 4.

Preferred embodiments of the objective for video disks according to the present invention explained in the above are as shown below.

| Embodiment 1 | | | |
|---|---|---|---|
| $f = 1.0$ | W.D. = 0.1717 | $\beta$ = 1/20X | N.A. = 0.5 |
| $r_1 = 2.1548$ | | | |
| | $d_1 = 0.3525$ | $n_1 = 1.51462$ | $\nu_1 = 64.15$ |
| $r_2 = -1.0755$ | | | |
| | $d_2 = 0.1178$ | | |
| $r_3 = -0.8473$ | | | |
| | $d_3 = 0.1365$ | $n_2 = 1.73541$ | $\nu_2 = 27.79$ |
| $r_4 = -2.5501$ | | | |
| | $d_4 = 0.4026$ | | |
| $r_5 = 1.3636$ | | | |
| | $d_5 = 0.3489$ | $n_3 = 1.51462$ | $\nu_3 = 64.15$ |
| $r_6 = -2.2503$ | | | |
| | $d_6 = 0.4006$ | | |

| -continued | | | |
|---|---|---|---|
| Embodiment 1 | | | |
| $r_7 = 0.6076$ | | | |
| | $d_7 = 0.3240$ | $n_4 = 1.51462$ | $\nu_4 = 64.15$ |
| $r_8 = \infty$ | | | |

| Embodiment 2 | | | |
|---|---|---|---|
| $f = 1.0$ | W.D. = 0.1683 | $\beta$ = 1/20X | N.A. = 0.5 |
| $r_1 = 1.7720$ | | | |
| | $d_1 = 0.2802$ | $n_1 = 1.51462$ | $\nu_1 = 64.15$ |
| $r_2 = -1.2855$ | | | |
| | $d_2 = 0.0959$ | | |
| $r_3 = -1.0660$ | | | |
| | $d_3 = 0.1865$ | $n_2 = 1.73541$ | $\nu_2 = 27.79$ |
| $r_4 = -2.7354$ | | | |
| | $d_4 = 0.4553$ | | |
| $r_5 = 1.1889$ | | | |
| | $d_5 = 0.4014$ | $n_3 = 1.51462$ | $\nu_3 = 64.15$ |
| $r_6 = 12.9485$ | | | |
| | $d_6 = 0.3973$ | | |
| $r_7 = 0.4325$ | | | |
| | $d_7 = 0.2141$ | $n_4 = 1.51462$ | $\nu_4 = 64.15$ |
| $r_8 = \infty$ | | | |

| Embodiment 3 | | | |
|---|---|---|---|
| $f = 1.0$ | W.D. = 0.1712 | $\beta$ = 1/20X | N.A. = 0.5 |
| $r_1 = 1.8687$ | | | |
| | $d_1 = 0.3494$ | $n_1 = 1.51462$ | $\nu_1 = 64.15$ |
| $r_2 = -1.1377$ | | | |
| | $d_2 = 0.1035$ | | |
| $r_3 = -0.9254$ | | | |
| | $d_3 = 0.1410$ | $n_2 = 1.73541$ | $\nu_2 = 27.79$ |
| $r_4 = -3.2337$ | | | |
| | $d_4 = 0.4100$ | | |
| $r_5 = 1.3658$ | | | |
| | $d_5 = 0.3547$ | $n_3 = 1.51462$ | $\nu_3 = 64.15$ |
| $r_6 = -3.0675$ | | | |
| | $d_6 = 0.4007$ | | |
| $r_7 = 0.5507$ | | | |
| | $d_7 = 0.3189$ | $n_4 = 1.51462$ | $\nu_4 = 64.15$ |
| $r_8 = \infty$ | | | |

| Embodiment 4 | | | |
|---|---|---|---|
| $f = 1.0$ | W.D. = 0.1713 | $\beta$ = 1/20X | N.A. = 0.5 |
| $r_1 = 2.1821$ | | | |
| | $d_1 = 0.3426$ | $n_1 = 1.51462$ | $\nu_1 = 64.15$ |
| $r_2 = -0.9996$ | | | |
| | $d_2 = 0.0228$ | | |
| $r_3 = -0.9613$ | | | |
| | $d_3 = 0.1340$ | $n_2 = 1.73541$ | $\nu_2 = 27.79$ |
| $r_4 = -2.7630$ | | | |
| | $d_4 = 0.4797$ | | |
| $r_5 = 1.2340$ | | | |
| | $d_5 = 0.3596$ | $n_3 = 1.51462$ | $\nu_3 = 64.15$ |
| $r_6 = -206.7782$ | | | |
| | $d_6 = 0.4017$ | | |
| $r_7 = 0.5410$ | | | |
| | $d_7 = 0.3343$ | $n_4 = 1.51462$ | $\nu_4 = 0\ 64.15$ |
| $r_8 = \infty$ | | | |

In the above embodiments, reference symbols $r_1$ through $r_8$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses at $\lambda = 6328$ Å, and reference symbols $\nu_1$, $\nu_2$, $\nu_3$ and $\nu_4$ respectively represent Abbe's numbers of respective lenses for d-line. The working distance W.D. represents the distance from the eighth surface r8 to the cover glass C.

As explained in the above and illustrated by respective embodiments, the objective for video disks according to the present invention comprises a small number of lenses, i.e., four lenses, and is light in weight. Besides, the objective for video disks according to the present invention has large N.A. of 0.5 and aberrations corrected favourably. Moreover, by taking chromatic aberration into consideration, glass materials having small dispersive powers are used for positive lenses and glass material having large dispersive power is used for the negative lens. The objective for video disks according to the present invention can be used both for recording and reproducing.

I claim:

1. An objective for video disks comprising a first, second, third and fourth lenses, said first lens being a biconvex lens, said second lens being a negative lens, said third lens being a positive lens, said fourth lens being a positive lens, said objective for video disks satisfying the following conditions:

$$0.75 < r_3/r_2 < 1.0 \quad (1)$$

$$0.8 < |r_3|/f < 1.1, r_3 < 0 \quad (2)$$

$$0.4 < r_7/f < 0.65 \quad (3)$$

$$0.2 < d_7/f < 0.4 \quad (4)$$

$$0 < d_2/f < 0.12 \quad (5)$$

$$1.1f < d_4 + d_5 + d_6 < 1.3f \quad (6)$$

$$-0.46 < f/r_6 < 0.08 \quad (7)$$

wherein reference symbol $r_2$ represents the radius of curvature of the surface on the second lens side of the first lens, reference symbol $r_3$ represents the radius of curvature of the surface on the first lens side of the second lens, reference symbol $r_7$ represents the radius of curvature of the surface on the third lens side of the fourth lens, reference symbol f represents the focal length of the lens system as a whole, reference symbols $d_2$, $d_4$ and $d_6$ respectively represent airspaces between the first and second lenses, between the second and third lenses and between the third and fourth lenses, reference symbols $d_5$ and $d_7$ respectively represent thicknesses of the third and fourth lenses, and reference symbol $r_6$ represents the radius of curvature of the surface on the fourth lens side of the third lens.

2. An objective for video disks according to claim 1, in which said objective for video disks has the following numerical data:

| f = 1.0 | W.D. = 0.1717 | β = 1/20X | N.A. = 0.5 |
|---|---|---|---|
| $r_1$ = 2.1548 | | | |
| | $d_1$ = 0.3525 | $n_1$ = 1.51462 | $\nu_1$ = 64.15 |
| $r_2$ = −1.0755 | | | |
| | $d_2$ = 0.1178 | | |
| $r_3$ = −0.8473 | | | |
| | $d_3$ = 0.1365 | $n_2$ = 1.73541 | $\nu_2$ = 27.79 |
| $r_4$ = −2.5501 | | | |
| | $d_4$ = 0.4026 | | |
| $r_5$ = 1.3636 | | | |
| | $d_5$ = 0.3489 | $n_3$ = 1.51462 | $\nu_3$ = 64.15 |
| $r_6$ = −2.2503 | | | |
| | $d_6$ = 0.4006 | | |
| $r_7$ = 0.6076 | | | |
| | $d_7$ = 0.3240 | $n_4$ = 1.51462 | $\nu_4$ = 64.15 |
| $r_8$ = ∞ | | | | wherein reference symbols $r_1$ through $r_6$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses at λ=6328 Å, reference symbols $\nu_1$, $\nu_2$, $\nu_3$ and $\nu_4$ respectively represent Abbe's numbers of respective lenses for d-line, reference symbol f represents the focal length of the lens system as a whole, reference symbol W.D. represents the working distance, reference symbol β represents magnification, and reference symbol N.A. represents the numerical aperture.

3. An objective for video disks according to claim 1, in which said objective for video disks has the following numerical data:

| f = 1.0 | W.D. = 0.1683 | β = 1/20X | N.A. = 0.5 |
|---|---|---|---|
| $r_1$ = 1.7720 | | | |
| | $d_1$ = 0.2802 | $n_1$ = 1.51462 | $\nu_1$ = 64.15 |
| $r_2$ = −1.2855 | | | |
| | $d_2$ = 0.0959 | | |
| $r_3$ = −1.0660 | | | |
| | $d_3$ = 0.1865 | $n_2$ = 1.73541 | $\nu_2$ = 27.79 |
| $r_4$ = −2.7354 | | | |
| | $d_4$ = 0.4553 | | |
| $r_5$ = 1.1889 | | | |
| | $d_5$ = 0.4014 | $n_3$ = 1.51462 | $\nu_3$ = 64.15 |
| $r_6$ = 12.9485 | | | |
| | $d_6$ = 0.3973 | | |
| $r_7$ = 0.4325 | | | |
| | $d_7$ = 0.2141 | $n_4$ = 1.51462 | $\nu_4$ = 64.15 |
| $r_8$ = ∞ | | | | wherein reference symbols $r_1$ through $r_6$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses at λ=6328 Å, reference symbols $\nu_1$, $\nu_2$, $\nu_3$ and $\nu_4$ respectively represent Abbe's numbers of respective lenses for d-line, reference symbol f represents the focal length of the lens system as a whole, reference symbol W.D. represents the working distance, reference symbol β represents magnification, and reference symbol N.A. represents the numerical aperture.

4. An objective for video disks according to claim 1, in which said objective for video disks has the following numerical data:

| f = 1.0 | W.D. = 0.1712 | β = 1/20X | N.A. = 0.5 |
|---|---|---|---|
| $r_1$ = 1.8687 | | | |
| | $d_1$ = 0.3494 | $n_1$ = 1.51462 | $\nu_1$ = 64.15 |
| $r_2$ = −1.1377 | | | |
| | $d_2$ = 0.1035 | | |
| $r_3$ = −0.9254 | | | |
| | $d_3$ = 0.1410 | $n_2$ = 1.73541 | $\nu_2$ = 27.29 |
| $r_4$ = −3.2337 | | | |
| | $d_4$ = 0.4100 | | |
| $r_5$ = 1.3658 | | | |
| | $d_5$ = 0.3547 | $n_3$ = 1.51462 | $\nu_3$ = 64.15 |
| $r_6$32 −3.0675 | | | |
| | $d_6$ = 0.4007 | | |
| $r_7$ = 0.5507 | | | |
| | $d_7$ = 0 0.3189 | $n_4$ = 1.51462 | $\nu_4$ = 64.15 |
| $r_8$ = ∞ | | | | wherein reference symbols $r_1$ through $r_6$ respectively represent radii of curvature of respective lens surfaces, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses at $\lambda = 6328$ Å, reference symbols $\nu_1$, $\nu_2$, $\nu_3$ and $\nu_4$ respectively represent Abbe's numbers of respective lenses for d-line, reference symbol f represents the focal length of the lens system as a whole, reference symbol W.D. represents the working distance, reference symbol $\beta$ represents magnification, and reference symbol N.A. represents the numerical aperture.

5. An objective for video disks according to claim 1, in which said objective for video disks has the following numerical data:

| | | | |
|---|---|---|---|
| f = 1.0 | W.D. = 0.1713 | $\beta$ = 1/20X | N.A. = 0.5 |
| $r_1$ = 2.1821 | | | |
| | $d_1$ = 0.3426 | $n_1$ = 1.51462 | $\nu_1$ = 64.15 |
| $r_2$ = −0.9996 | | | |
| | $d_2$ = 0.0228 | | |
| $r_3$ = −0.9613 | | | |
| | $d_3$ = 0.1340 | $n_2$ = 1.73541 | $\nu_2$ = 27.79 |
| $r_4$ = −2.7630 | | | |
| | $d_4$ = 0.4797 | | |
| $r_5$ = 1.2340 | | | |
| | $d_5$ = 0.3596 | $n_3$ = 1.51462 | $\nu_3$ = 64.15 |
| $r_6$ = −206.7782 | | | |
| | $d_6$ = 0.4017 | | |
| $r_7$ = 0.5410 | | | |
| | $d_7$ = 0.3343 | $n_4$ = 1.51462 | $\nu_4$ = 64.15 |
| $r_8$ = ∞ | | | | wherein reference symbols $r_1$ through $r_6$ respectively represent radii of curvature of respective lens surface, reference symbols $d_1$ through $d_7$ respectively represent thicknesses of respective lenses and airspaces between respective lenses, reference symbols $n_1$, $n_2$, $n_3$ and $n_4$ respectively represent refractive indices of respective lenses at $\lambda = 6328$ Å, reference symbols $\nu_1$, $\nu_2$, $\nu_3$ and $\nu_4$ respectively represent Abbe's numbers of respective lenses for d-line, reference symbol f represents the focal length of the lens system as a whole, reference symbol W.D. represents the working distance, reference symbol $\beta$ represents magnification, and reference symbol N.A. represents the numerical aperture.

* * * * *